(12) United States Patent
Boussemart et al.

(10) Patent No.: US 7,907,835 B2
(45) Date of Patent: Mar. 15, 2011

(54) LIQUID HEATING DEVICE AND METHOD FOR HEATING A LIQUID

(75) Inventors: Christophe S. Boussemart, Lugrin (FR); Jean-Bernard Pulzer, Fleurier (CH)

(73) Assignee: Nestec S.A., Vevey (CH)

( * ) Notice: Subject to any disclaimer, the term of this patent is extended or adjusted under 35 U.S.C. 154(b) by 708 days.

(21) Appl. No.: 11/575,190

(22) PCT Filed: Sep. 9, 2005

(86) PCT No.: PCT/EP2005/009689
§ 371 (c)(1),
(2), (4) Date: Feb. 6, 2008

(87) PCT Pub. No.: WO2006/029763
PCT Pub. Date: Mar. 23, 2006

(65) Prior Publication Data
US 2008/0273868 A1    Nov. 6, 2008

(30) Foreign Application Priority Data
Sep. 13, 2004   (EP) ..................................... 04021674

(51) Int. Cl.
*F23H 1/10* (2006.01)
*A23L 1/00* (2006.01)
(52) U.S. Cl. .......................................... 392/479; 99/275
(58) Field of Classification Search .......... 392/465–496; 99/275
See application file for complete search history.

(56) References Cited

U.S. PATENT DOCUMENTS

| 3,953,923 | A | * | 5/1976 | Rygmyr | 29/611 |
| 4,975,559 | A | * | 12/1990 | Frisch | 392/449 |
| 5,434,388 | A | * | 7/1995 | Kralik et al. | 219/538 |
| 6,246,831 | B1 | | 6/2001 | Seitz et al. | |
| 6,459,854 | B1 | * | 10/2002 | Yoakim et al. | 392/479 |

FOREIGN PATENT DOCUMENTS

| EP | 1 380 243 | 1/2004 |
| GB | 2 152 012 | 7/1985 |

* cited by examiner

*Primary Examiner* — Daniel Robinson
(74) *Attorney, Agent, or Firm* — K&L Gates LLP

(57) ABSTRACT

The invention relates to a liquid heating device, in particular for household application, mainly, for preparing hot beverages comprising a body provided with a liquid flow channel which comprises a liquid inlet and outlet and is connected to at least one electrical heating body whose feeding is controlled by switching means connected to control means. The inventive device is characterised in that the channel consists of at least one first and second portions thereof which are connected to each other by a third channel portion forming a connection conduit, each first and second channel portion are associated with the heating body and the connection conduit is associated with an intermediate temperature sensor connected to said control means, wherein the temperature sensor is disposed in such a way that it is brought into contact with the liquid flowing in the channel and the control and switching means are configured in such a way that it is possible to control the heating body of said at least second channel portion according to the quantity of useful energy supplyable thereto in order to raise the intermediate temperature measured by the intermediate temperature sensor to a specified temperature.

32 Claims, 5 Drawing Sheets

LIQUID HEATING DEVICE AND METHOD FOR HEATING A LIQUID

The present invention relates to a device for heating a fluid intended to equip a machine for preparing hot beverages.

The present invention also relates to a method for quickly and accurately heating a liquid.

Patent EP 1 380 243 already discloses a heating device intended in particular to equip coffee machines. This heating device comprises a metal tube through which the liquid that is to be heated can flow from an inlet duct to an outlet duct. The exterior surface of the tube is covered over several sections of its length with a plurality of sets of electric resistive elements in series. A cylindrical insert extends inside the tube to form, with the interior wall of the tube, a helical duct through which the liquid can circulate and which thus encourages turbulent flow and rapid transfer of energy from the tube to the liquid. A flow meter is also positioned upstream of the inlet duct. The device further comprises a plurality of temperature sensors distributed along the length of the tube at the entry to and exit from each set of resistive elements. The principle governing the distribution of heating energy to the liquid in this instance is based on modulating the electrical power produced by the resistive elements which can be switched independently of one another or in series according to the water temperature at the inlet to the duct.

Although this device gives results which are satisfactory in terms of the speed of heating, this device is relatively bulky in that the volume of water to be heated determines the height of the tube, and is expensive in that it requires resistive elements to be printed in the form of thick films on the surface of the tube (using what is currently known as "thick film" technology).

Furthermore, the accuracy with which the liquid temperature is regulated is limited by the fact that the liquid does not come into direct contact with the sensors which are positioned outside the tube. The rate of response to temperature differences, due to the inertia of the liquid that is to be heated, is also slower, and this detracts from the accuracy with which the temperature can be regulated. It should also be noted that the proximity of the temperature sensors to the sets of resistive elements runs the risk of influencing the measurement in an uncontrollable manner because of the thermal conduction that occurs through the wall of the tube.

In the field of coffee machines, the flow rates of water to be heated in order to prepare a coffee are relatively low, typically of the order of a few tens of ml/min. Now, the flow meters available on the market are not very accurate at measuring flow rates lower than 200 ml/min. The uncertainties on the measurements of the flow rate in this application are therefore an additional problem in precisely calculating the energy that needs to be supplied in order to reach the reference temperature at the outlet of the device. In EP 1 380 243, the inaccuracies due to the flow meter are therefore not corrected until the fluid leaves the heating device because only the inlet temperature is taken into consideration when calculating the amount of energy to be supplied to the device.

In addition, that document does not discuss any practical embodiment that would allow the temperature sensors to be arranged on the surface of the tube, such an arrangement appearing in any event to be tricky because of the technology proposed for producing the sets of resistive elements.

U.S. Pat. No. 6,246,831 relates to a system for monitoring the heating of fluid for domestic heating or an individual hot water tank comprising several heating chambers containing continuous electric-heating elements. Temperature regulation is based on temperature sensors in each chamber and on determining a difference between a reference temperature and the sum of the temperatures measured in each chamber. A control then responds quickly to the changes in temperature and modifies the power calculation by altering the power modulation. Such a method does not, however, take account of instantaneous variations in the actual amount of fluid flowing through the device; this amount being based on an indirect method of calculation. Thus, sudden changes to the operating conditions may render this calculation ineffective, and this makes the system essentially suited to stable flow conditions but ill-suited to the production of hot water in a coffee machine which experiences sudden variations in flow rate.

It is therefore an object of the present invention to solve the aforementioned disadvantages, together with others also, by providing a device for heating a liquid that employs means that are simple, compact and inexpensive.

Another object of the present invention is to provide such a heating device that allows a liquid to be heated instantaneously, with reduced preheating of the heating system and without storing latent thermal energy beforehand, at a given outlet temperature ranging between the inlet temperature and 100° C., making it possible to improve the accuracy in terms of the liquid outlet temperature and to provide just the right amount of energy to heat the liquid to the said reference temperature.

To this end, the present invention relates to a device for heating a liquid, in the form of a hot liquid or steam, particularly for household applications and more especially for preparing hot beverages, comprising a body equipped with a duct for circulating a fluid, the said duct having a liquid inlet and a liquid outlet and being associated with at least one electrical heating body the supply of power to which is controlled by switching means connected to control means; the said duct comprising at least first and second duct portions joined together by a third duct portion forming a connecting conduit; the said at least first and second duct portions each being associated with at least one heating body. The connecting conduit is associated with an intermediate temperature sensor connected to the said control means; the said intermediate temperature sensor being arranged to come into direct or indirect contact with the liquid flowing through the said duct to measure the temperature of the liquid. The said device is characterized in that it comprises a flow meter which measures the amount of liquid passing through the said duct and in that the control and switching means are configured to control the heating body of the said at least second duct portion according to the amount of energy that needs to be supplied in the said second duct portion in order to bring the intermediate temperature measure by the said intermediate temperature sensor up to a reference temperature; the said amount of energy being calculated by the control means as a function of the amount of liquid measured by the flow meter, of the intermediate temperature measured and of the reference temperature at the outlet of the device, this amount of energy being distributed to the said heating body of the said at least second duct portion by the control and switching means at determined time intervals.

According to a preferred embodiment, the determined time intervals are shorter than 500 milliseconds. It will be noted in this regard that when a pulse flow meter is used, the time interval will be set to the pulse frequency of the pulse flow meter.

The invention therefore provides better accuracy in the temperature regulation, and therefore better use of the consumed energy because, on the one hand, the temperature of the liquid that is to be heated is being measured directly and, on the other hand, because the heating energy calculated and distributed takes account of the instantaneous variations in flow rate.

According to advantageous features, the device of the invention further comprises a liquid inlet temperature sensor arranged to come into direct or indirect contact with the liquid at the inlet of the device to measure the temperature of the liquid, and a flow meter located, for example, upstream of the inlet to the first chamber. Regulating means are also provided for calculating a power correction factor to be assigned to the heating body of the said second duct portion as a function of the measured inlet and intermediate temperatures, of the flow rate measured by the flow meter and of the energy balance.

As a preference, the control and switching means are also configured to control the heating body of the said first duct portion as a function of the theoretical amount of energy that needs to be supplied in the said first duct portion in order to bring the amount of fluid from the inlet temperature measured by the inlet sensor to an intermediate reference temperature.

In practice, in order to distribute an appropriate theoretical amount of energy to the heating body of the first duct portion, the temperature of the liquid that is to be heated is measured at the inlet to the device, by means of a sensor in direct or indirect contact with the fluid that is to be measured, and the amount of energy to be supplied is determined as a function of the amount of liquid to be heated (determined by the flow meter) in order to reach an intermediate reference temperature using the formula E=amount of liquid to be heated× $(T_{intermediate\ reference} - T_{input\ measured})$ ×Heat capacity of the liquid.

In order to distribute an appropriate theoretical amount of energy to the heating body of the second duct portion, the amount of energy is calculated using the formula E=amount of liquid to be heated as measured by the flow meter×(desired output temperature−measured intermediate temperature)× heat capacity of the liquid.

However, in order to take account of any errors and inaccuracies there might be, for example on the flow rate measurement, the tolerances on the power of the resistive elements, the mains voltage, or the like, it is preferable to apply a correction factor calculated using the formula:

$$k = (T_{intermediate\ measured} - T_{inlet\ measured}) / (T_{intermediate\ reference} - T_{inlet\ measured}).$$

The correction factor is then applied by the control means to adjust the value of the amount of energy needed to heat the liquid in the second chamber so as to obtain the temperature closest to the desired temperature on the outlet side of the heating block.

These corrected energy balance calculations and the distribution of the amounts of energy thus calculated to the heating bodies are performed at brief intervals and are repeated to take account of the variations in flow rate logged by the flow meter.

As a preference, the calculation is done at regular intervals of about 30 ms. The amount of heating energy thus determined by this calculation is then distributed on each pulse of the flow meter (in the case of a flow meter operating in a pulse mode) or, typically, every 10 to 100 ms approximately, preferably every 10 to 30 ms. The heating is thus able to respond rapidly to sudden variations in flow rate.

The structure of the device of the present invention therefore makes it possible advantageously to determine precisely the difference between the reference intermediate temperature and the measured intermediate temperature and therefore to calculate a correction factor in order to determine accurately the amount of energy that needs to be supplied to the liquid in the next duct portion or portions in order to bring the liquid from the measured intermediate temperature to the reference outlet temperature.

The device of the invention thus makes it possible to compensate for errors and correct the inaccuracies and tolerances arising from the measurement elements and those concerned with the production of the heating energy, particularly the measurement areas of the flow meter, the tolerances on the power of the resistive elements, the mains voltage and the like.

In order to correct these errors in the second duct portion; in particular the tolerances on the power of the resistive elements, the mains voltage and other inaccuracies, it is therefore possible to measure the outlet temperature and, using the same energy balance calculations, to calculate a new correction factor to be applied to this second duct portion. This second correction factor will be applied to the amount of energy to be applied in the next calculation.

In order also to compensate for fluctuations in mains voltage with respect to a nominal value, the device regularly measures the mains voltage and/or current and calculates a correction factor representative of the variation in the voltage and/or in the current and assigns this correction factor to the calculation of the amount of energy to be supplied to the heating bodies, so as to adjust the times for which the resistive elements are switched on according to these variations.

According to a preferred embodiment of the invention, the duct portions associated respectively with at least one heating body form each of the chambers joined together by a connecting conduit, which has a cross section smaller than that of the chambers, one or more heating bodies being immersed in each of the chambers.

According to advantageous features, each heating body comprises at least one resistive element, each resistive element of each heating body being independently switchable. In this way, temperature adjustments can be made more rapidly and with greater accuracy in terms of outlet temperature. This also avoids the problems associated with sudden voltage increases or drops ("flickering" effect).

According to a first embodiment, the heating bodies are two in number, each being housed in a separate chamber and each comprising two resistive elements, each resistive element of the two heating bodies being configured to be switched independently of one another by the switching means.

According to a second embodiment, the heating bodies are four in number, each being housed in a separate chamber and comprising a resistive element, each resistive element being configured to be switched independently by the switching means. In this embodiment, the intermediate temperature sensor is positioned downstream of the chamber communicating with the liquid inlet and upstream of the chamber communicating with the liquid outlet.

The structure of the device according to the invention thus makes it possible to use heating bodies having the form of heating cartridges which are commercially available and particularly economical in comparison with the sets of printed resistive elements of the prior art.

The use of a plurality of cartridges of this type, having a nominal power of less than 450 W, preferably of 400 W or less, at 230V, advantageously, through successive and non-simultaneous switching of the various cartridges arranged in the duct, at a certain frequency, preferably of the order of every 10 ms, allows the electrical load on the mains to be spread and thus makes it possible to limit the risks of sudden voltage jumps that would cause flickering phenomena. In addition, the use of this type of heating cartridge allows a device to be produced that has low thermal inertia and makes it possible for liquids to be dispensed successively at different outlet temperatures, for example temperatures determined according to the nature of the beverage to be prepared, at closely-spaced time intervals. In particular, the device of the invention can be used to optimize variable liquid temperatures in a machine for preparing hot beverages as described in the pending American patent application U.S. Ser. No. 10/983,671, filed on 9 Nov. 2004 and entitled "Method and device for optimizing the variable temperatures of a liquid". The full content of this application is incorporated herein by reference.

The invention also relates to a method for rapidly and accurately heating a liquid particularly for household applications and more especially for preparing coffee or other hot beverages. The method comprises a heating device comprising a body equipped with a duct for the circulation of the liquid, at least a first heating body associated with a first duct portion, at least a second heating body associated with a second duct portion. According to the method of the invention:

a) the amount of liquid to be heated is measured by a flow meter,
b) the intermediate temperature is measured by an intermediate temperature sensor placed in direct or indirect contact with the liquid between the first and second heating bodies,
c) the theoretical amount of energy to be supplied by the second heating body is calculated by the control means as a function of the measured amount of liquid to be heated, of the measured intermediate temperature, of the reference temperature at the outlet of the device and of the heat capacity of the liquid,
d) this calculated amount of energy is applied by the switching means to the second heating bodies, by selective switching of the heating bodies, so as to bring the liquid up to (or at least as close as possible to) the desired reference temperature at the outlet of the device,
e) at least several of steps a) to d) are repeated by the control means at determined time intervals.

According to a preferred embodiment of the method, at least several of steps a) to d) are repeated at time intervals of 500 milliseconds or shorter.

The time interval will be set, for distributing the amount of energy in step d), to the pulse frequency of the pulse flow meter or, at least, to a determined frequency of the order of one to a few tens of milliseconds, for some other type of flow meter.

Such a method makes it possible to obtain improved accuracy on the desired outlet temperature of the liquid, particularly by virtue of the actual measurement of the temperatures of the liquid (rather than the temperatures of the heating body, as in the prior art) and by determining the amounts of energy supplied, which takes account of the actual variations in the flow rate of liquid through the device.

According to one preferred embodiment of the method of the invention, the amounts of energy to be applied both to the first and to the second heating bodies are calculated as a function of measured temperature variables and of the measurement from the flow meter.

The method then comprises the following steps:

f) the temperature of the liquid at the inlet to the device is measured by a liquid inlet temperature sensor placed in direct or indirect contact with the liquid,
g) the amount of liquid to be heated is measured by a flow meter,
h) the theoretical amount of energy to be supplied by the first heating body is calculated by a control means as a function of the measured amount of liquid, of the measured temperature at the inlet to the device, of an intermediate reference temperature and of the heat capacity of the liquid,
i) the intermediate temperature is measured by an intermediate temperature sensor placed in direct or indirect contact with the liquid between the first and second heating bodies,
j) the theoretical amount of energy to be supplied by the second heating body is calculated by the control means as a function of the measured amount of liquid to be heated, of the measured intermediate temperature, of the reference temperature at the outlet of the device and of the heat capacity of the liquid,
k) these calculated amounts of energy are applied by the switching means respectively to the first and second heating bodies, by selectively switching the heating bodies, so as to bring the liquid up to (or at least as close as possible to) the desired reference temperature at the outlet of the device,
l) at least several of steps f) to k) are repeated by the control means at determined time intervals.

According to a preferred embodiment, the method takes account of the overall inaccuracies and errors that may originate from various components of the device (for example the flow meter, the resistive elements, etc.) or the mains voltage so as to refine the amount of energy supplied, in particular, to the second heating body and thus obtain better accuracy in the heating. To do that, a correction factor is calculated using the formula:

$$k=\text{(measured intermediate temperature−measured input temperature)/(reference intermediate temperature−measured input temperature)},$$ and this correction factor is applied so as to calculate the amount of energy to be supplied by the second heating body.

The method of the invention is of course applied in loop form, at closely spaced time intervals (of the order of a few milliseconds apart, for example, every 30 ms as far as calculation is concerned and every 10 ms as far as the distribution of energy to the heating bodies is concerned) as the liquid passes through the heating device; in particular, using regulating means such as a microcontroller or other equivalent electronic regulating means.

According to one aspect of the invention, the temperature of the liquid is measured by sensors which are in direct or indirect contact with the liquid. The expression "direct" contact is to be understood as meaning a measurement using a sensor immersed in the liquid. This may, for example, be an NTC sensing element protected by glass or ceramic. The expression "indirect" contact is to be understood as meaning a measurement using a sensor (such as a fine NTC sensing element) fixed for example by bonding onto the dry side of a non-heating conduit in or against which the liquid flows, such as a metal tube. In any event, the liquid separates the sensor from the actual heating body in such a way that the temperature measured is the temperature of the liquid rather than a temperature affected by the conduction of the heating body against a solid thermally-conducting surface.

According to another aspect, the invention relates to a device for heating a fluid, in the form of hot liquid or steam, for preparing coffee or other hot beverages, comprising a body equipped with a duct for circulating a fluid, the said duct having a fluid inlet and a fluid outlet connected by a conduit to a user device, the duct being associated with at least one electrical heating body the power supply of which is controlled by switching means connected to control means; the device further comprising at least one temperature sensor positioned in the said duct or at the outlet of the said duct and in direct contact with the fluid flowing through the said duct, the said temperature sensor being connected to the said control means; the control and switching means being configured to control the heating body so as to bring the fluid that is to be heated from a first temperature up to a reference temperature in the region of the duct at which the said sensor is installed, the said device being characterized in that it further comprises an electrically operated valve connected to the said conduit between the fluid outlet and the said user device and which is controlled by the said control means, and in that the said control means are arranged in such a way as to control the electrically operated valve in such a way as to direct the fluid emanating from the fluid outlet towards a drainage tank or a recirculation loop when the temperature measured by the said sensor has not yet reached the reference temperature and towards the user device when the measured temperature has reached the reference temperature.

The reference temperature may be a theoretical intermediate temperature of the device when the said temperature sensor is positioned in such a way as to measure an intermediate temperature in the said duct. In an alternative, the reference temperature is the desired outlet temperature when the temperature sensor is positioned at the outlet of the duct so as to measure the fluid temperature at the outlet of the device.

By virtue of these features, it is possible to be sure that the fluid bound for the user device, typically a unit for extracting a substance, for example coffee, or a steam ejection nozzle, always reaches this device at a high enough temperature even when the device is used for the first time in the day. Given the low thermal inertia of the device, the period of bypass to the drainage tank is generally of the order of just a few seconds (typically from 3-6 seconds). This arrangement therefore allows beverages to be prepared quickly with a constant quality independent of any fluctuations there might be in the heating device.

Other features and advantages of the present invention will become more clearly apparent from the detailed description which follows of some embodiments of the heating device according to the invention, these being given purely by way of nonlimiting illustration in conjunction with the attached drawings in which.

Figure 1:
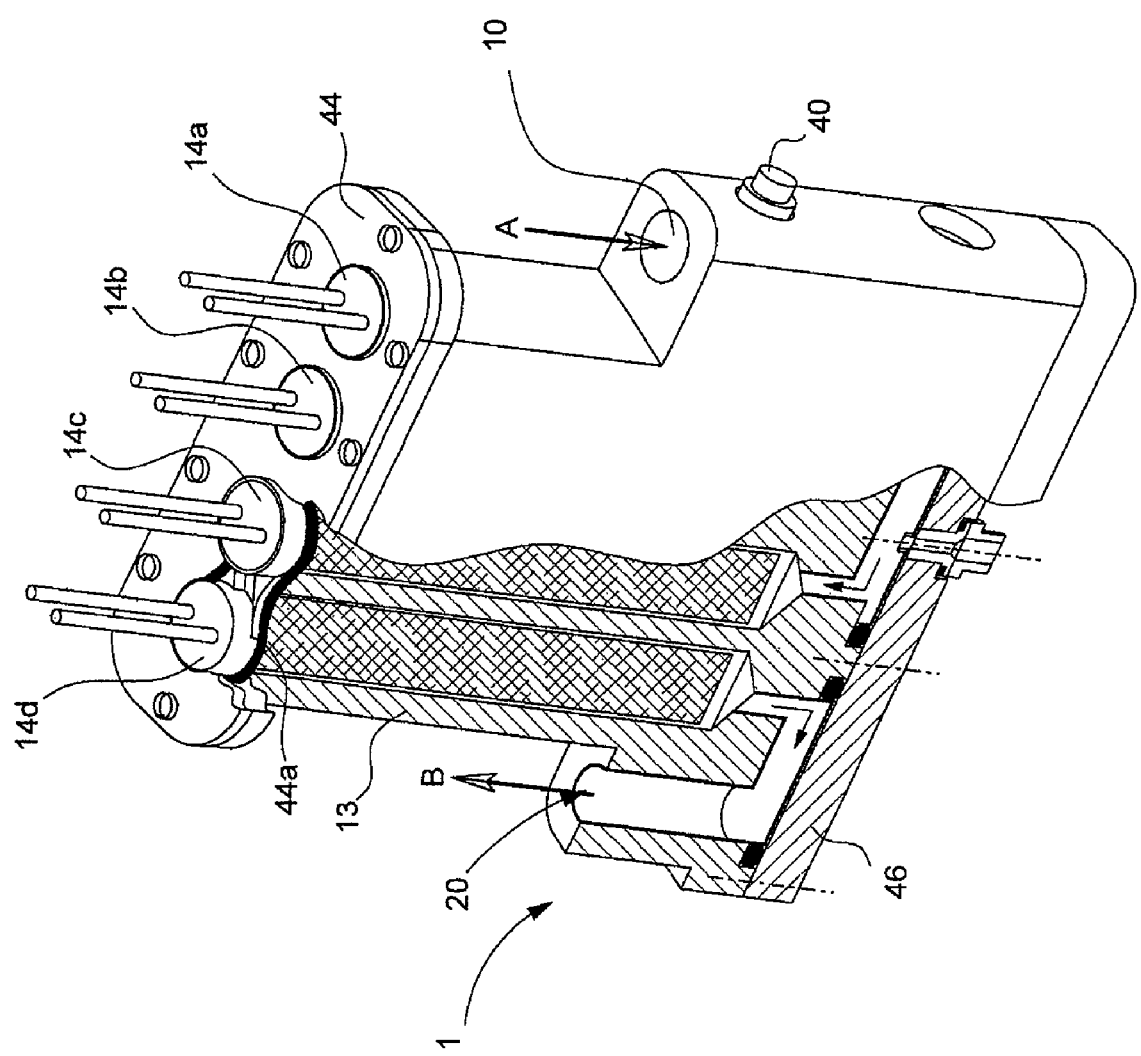
FIG. 1 is a perspective view with partial cutaway of a device for heating a liquid according to a first embodiment of the invention.
Figure 2:
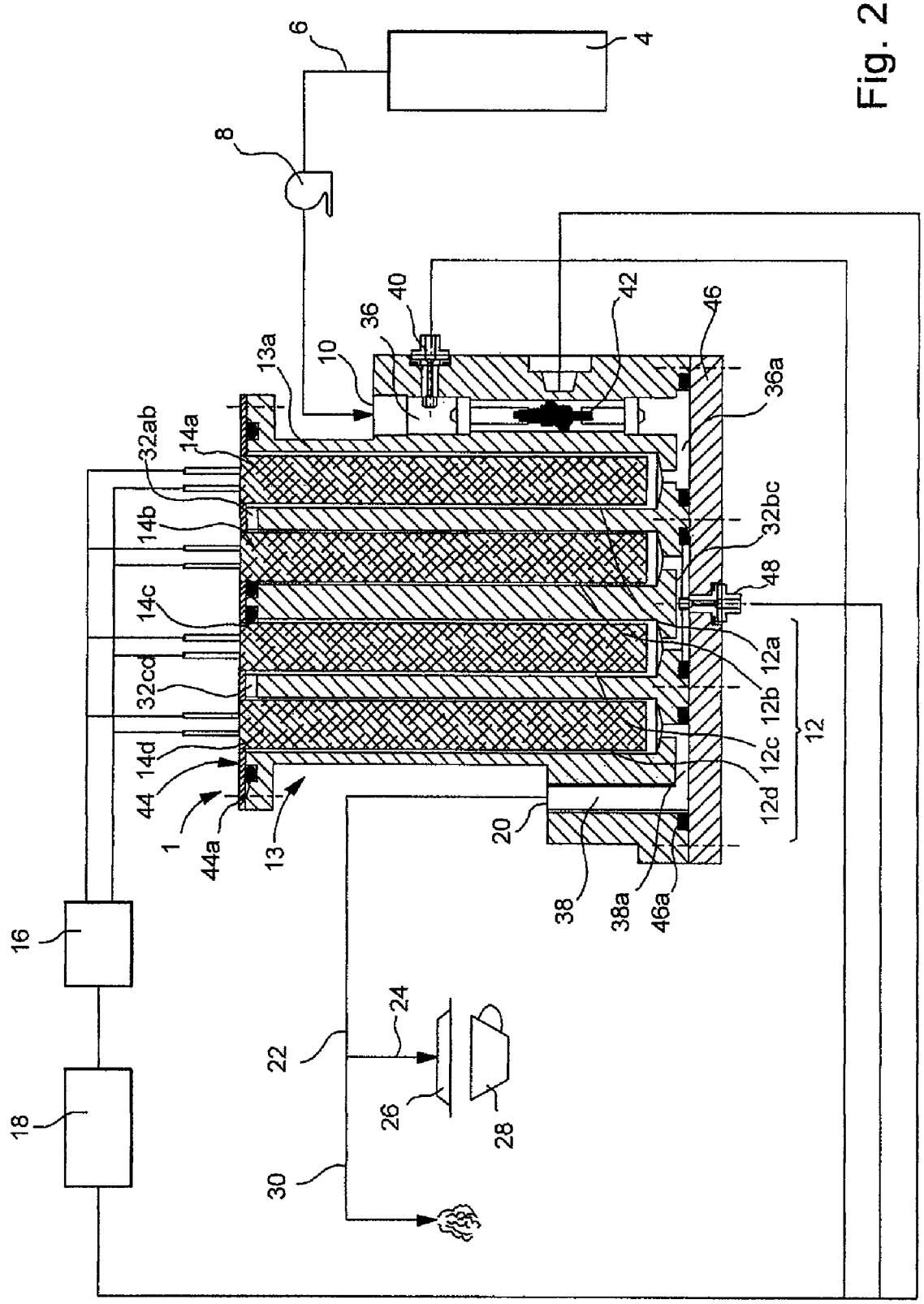
FIG. 2 is a schematic view of a coffee machine comprising the heating device of FIG. 1, the heating device being depicted in section.

With reference to FIGS. 1 and 2, these illustrate, by way of example, a device for heating a liquid according to a first embodiment denoted by the general numerical reference 1, incorporated into a coffee machine 2 (FIG. 2) which may with equal preference be intended for household or industrial use. Note that the nature of the liquid to be heated in the heating device is not critical and that the liquid may be any liquid, for example water, milk, a chocolate beverage, etc. In the application of the heating device illustrated, the liquid to be heated is water. The coffee machine 2 illustrated in FIG. 2 comprises a cold water tank 4 connected via a pipe 6 to a pump 8 which supplies the heating device 1 with water via a liquid inlet 10. The water flows through a duct 12 provided in a body 13 of the heating device 1. The duct 12 is associated with heating bodies 14a, 14b, 14c and 14d, the supply of electrical power to which is controlled by switching means 16 connected to control means 18. The heating bodies are thus immersed in the liquid that is to be heated and are in direct contact therewith. The water leaves the heating device via a liquid outlet 20 then flows through a conduit 22 in order, through a conduit 24, to arrive at a cartridge 26 containing a substance intended to form a beverage such as coffee from roasted ground coffee or soluble coffee, tea, chocolate or other hot beverages. The cartridge 26 is, for example, a sealed cartridge which opens under the pressure of the liquid in accordance with the description of European patent no. 512 468. The coffee then flows into a mug 28. The machine also makes it possible to produce steam via the conduit 30 connected to the conduit 22. In FIG. 1, the direction in which the water flows through the heating device is indicated by the arrows A and B.

In the heating device 1 according to the first embodiment of the invention, the duct 12 comprises four duct portions 12a, 12b, 12c and 12d joined together in succession by three connecting conduits 32ab, 32bc and 32cd. The duct portions 12a, 12b, 12c and 12d each define a chamber which accommodates a heating body 14a, 14b, 14c and 14d. It will be noted in this regard that the connecting conduits 32ab, 32bc and 32cd have cross sections smaller than those of the chambers 12a, 12b, 12c and 12d. The chambers 12a, 12b, 12c and 12d are arranged parallel to one another and juxtaposed in a block 13a that the body 13 comprises. The chambers 12a, 12b, 12c and 12d all open onto a first side of the block 13a at a first of their ends via which the heating bodies 14a, 14b, 14c and 14d are introduced into the chambers 12a, 12b, 12c and 12d. The second ends of the chambers 12a, 12b, 12c and 12d open onto a second side of the block 13a the opposite side to the first, and the chambers 12a, 12b, 12c and 12d are joined together at one of their ends by the three connecting conduits 32ab, 32bc and 32cd. The chamber 12a is connected, on the one hand, to the liquid inlet 10 via a duct 36 by its end on the second side of the block 13a and, on the other hand, to the chamber 12b via the connecting conduit 32ab by its end on the first side of the block 13a. The chamber 12b is connected to the chamber 12c via the connecting conduit 32bc by its end on the second side of the block 13a. The chamber 12c is connected to the chamber 12d via the connecting conduit 32cd by its end on the first side of the block 13a and the chamber 12d is connected to the liquid outlet 20 via a conduit 38 by its end on the second side of the block 13a.

It will be noted that each heating body 14a, 14b, 14c and 14d extends more or less on the entire length of the chamber with which it is associated and has a shape that more or less complements that of the chamber with which it is associated. According to an advantageous variant (not depicted), the exterior surface of the heating bodies and/or the interior wall of the chamber associated therewith has a helical grooving, making it possible to lengthen the path of the liquid while it is contact with the heating bodies and its speed, and therefore increase the heat exchange coefficient, without thereby increasing the bulk of the heating device.

The heating device 1 further comprises a temperature sensor 40 positioned in the conduit 36 connecting the liquid inlet to the inlet of the chamber 12a. This sensor 40 is arranged to come into direct contact with the liquid that is to be heated and to measure the temperature of the liquid that is to be heated at the inlet to the heating device, that is to say before it has come into contact with one of the heating bodies of the device 1. A flow meter 42 is also provided in the conduit 36, therefore upstream of the chamber 12a.

As can be seen in FIG. 2, the body 13 further comprises two end plates 44, 46 lying respectively at the first and second side of the block 13a and covering the two ends of each of the chambers 12a, 12b, 12c and 12d. The end plate 44 on the first side of the block 13a bears the heating bodies 14a, 14b, 14c and 14d while the end plate 46 on the second side of the block 13a bears an intermediate temperature sensor 48. The intermediate temperature sensor 48 is associated with the connecting conduit 32bc and is designed to come into direct contact with the liquid that is to be heated flowing through the conduit.

The inlet temperature sensor 40, the flow meter and the intermediate temperature sensor 48 are connected to the control means 18 of the device 1.

The end plate 44 closes off a first end of the chambers 12a, 12b, 12c and 12d and also together with the block 13a delimits the connecting conduits 32ab and 32cd. The end plate 46 closes off the second end of the chambers 12a, 12b, 12c and 12d and together with the block 13a delimits the conduit 32bc. The end plate 46 also delimits a duct 36a connecting the conduit 36 to the chamber 12a and the duct 38a connecting the chamber 12d to the conduit 38. Typically, the end plates 44 and 46 are fixed to the block 13a by means of screws (not depicted), and sealing is provided by means of O-ring seals 44a, 46a interposed between the end plates 44, 46 and the block 13a.

The control means 18 and the switching means 16 are configured to control the heating bodies 14a, 14b, 14c and 14d. These control means 16 are particularly arranged to control the heating bodies 14c and 14d arranged respectively in the chambers 12c, 12d situated downstream of the intermediate temperature sensor 48 as a function of the amount of energy that needs to be supplied to the chambers 12c and 12d in order to bring the liquid that is to be heated from the intermediate temperature measured by the intermediate temperature sensor 48 up to a reference temperature contained, for example, in a memory of the control means 18.

The heating bodies 14a, 14b, 14c and 14d each comprise a resistive element. The resistive elements are connected to the switching means 16 and the control means 18 are arranged in such a way as to be able to switch the resistive elements independently of one another. The principle of energy distribution is based on the pulses given by the flow meter (for example every 100 ms or less). An amount of energy, namely a heating time, given to the heating bodies corresponds to each pulse from the flow meter. This proportional system makes it possible to react to rapid variations in flow rate, something which may occur during the cycle of extracting from a capsule, in particular, at the time when the capsule is punctured. Each resistive element produces a nominal power lower than the mains flicker theoretical power value, typically of less than 450 W at 230 V. In accordance with standard IEC 1000-3-3, the maximum power that can be switched across the entire frequency range is about 380 W. In order to avoid power differences which, in absolute value, exceed the nominal power of each of the resistive elements, the control means 18 are designed to switch the resistive elements of the heating bodies from the "in circuit" status to the "out of circuit" status and vice versa intermittently and non-simultaneously. Switching is always done as the voltage crosses through zero to avoid introducing fluctuations into the electrical mains.

The control means 18 further comprise regulating means which are designed to calculate the amount of energy to be assigned to the heating bodies 14c, 14d positioned in the duct portions 12c, 12d situated downstream of the intermediate temperature sensor 48 as a function of the measured intermediate and input temperatures and as a function of the flow rate measured by the flow meter 42. Other factors may be taken into consideration in calculating the amount of energy, particularly the measurement of the mains voltage (for example 230 V). The amount of energy may be corrected by a correction factor based on the fluctuation between the actually measured mains voltage and the theoretical nominal voltage. This factor indicates whether the actual voltage is higher or lower than the nominal voltage, for example, of 230 V. This factor is updated when the resistive elements are switched in so as also to take account of voltage drops in the supply line.

The regulating means generally comprise a microcontroller, some memory and programs for calculating the energy balances and the correction factors to be applied. The energy balances, the corrections and the switchings of the heating bodies are calculated by the microcontroller at very closely spaced time intervals so as to constantly regulate the amounts of energy supplied to the heating bodies. The intervals for calculating the amounts of energy are of the order of a few milliseconds, preferably less than 100 ms, for example every 30 ms.

The automatic regulation mode is based on the following principle. A measurement of the temperature of the liquid at the inlet to the device is taken by the temperature sensor 40 at the inlet of the device; the amount of liquid to be heated is, for its part, measured by a flow meter 42 on the basis of pulses. An intermediate temperature between the first and second heating bodies is also measured by the temperature sensor 48. In an embodiment that comprises no liquid inlet temperature sensor, the system may start up on the basis of a theoretical inlet temperature, typically mains water temperature stored in memory in a microcontroller.

These measurements are gathered by the microcontroller comprising a program for calculating the amounts of energy. In particular, the microcontroller thus calculates the theoretical amount of energy to be supplied by the first heating body using the formula: amount of energy of the first heating bodies (14a, 14b, 14e)=amount of liquid to be heated as measured by the flow meter×($T_{intermediate\ reference} - T_{inlet\ measured}$)×heat capacity of the liquid. A corrector factor based on the variation in mains voltage may be applied to the final amount value.

The reference intermediate temperature is a value determined by calculation during testing of the device and which corresponds to an optimum theoretical value dependent on the measured temperature of the inlet water, the fixed (reference) outlet temperature, a 230 V mains correction factor, and the theoretical values of the ohmic resistance of the heating elements. This value varies as a function of the desired outlet temperature, for example for producing a coffee or some other beverage such as chocolate. This value is recorded in the program or in a memory of the microcontroller.

The microcontroller also calculates the theoretical amount of energy to be supplied by the second heating body using the formula: amount of energy for the second heating bodies (14c,14d, 14f)=amount of liquid to be heated as measured by the flow meter×(desired outlet temperature−measured intermediate temperature)×heat capacity of the liquid. This amount of energy may also be corrected in order to take account of the mains voltage.

The microcontroller then monitors the distribution of these calculated amounts of energy, per unit heating time, by switching the resistive elements contained in the heating bodies on and off.

However, in order to take account of any possible errors and inaccuracies such as in the measurement of the flow rate, tolerances on the power of the resistive elements, the mains voltage, or the like, it is preferable to apply a correction factor calculated using the formula:

$$k = (T_{intermediate\ measured} - T_{inlet\ measured}) / (T_{intermediate\ reference} - T_{inlet\ measured}).$$

The correction factor is then applied by the microcontroller to adjust the value of the amount of energy needed to heat the liquid in the second chamber so as to obtain a temperature as close as possible to the desired temperature at the outlet of the heating block.

Thus, the correction on the heating body or bodies is applied as follows:

Corrected amount of energy for the second heating body=(2−K)×theoretical amount of energy for the second heating body, or alternatively:

corrected amount of energy=(2−K)×heat capacity of the liquid×amount of liquid to be heated×(desired outlet temperature−measured intermediate temperature).This amount of energy may also be corrected to take account of the mains voltage.

Thus, when the correction factor is less than 1 that means that the actual amount of energy distributed by the heating body or bodies upstream of the intermediate temperature sensor is too low and that a correction therefore needs to be applied by increasing the amount of energy distributed by the heating body or bodies situated downstream of the intermediate temperature sensor. When the factor is higher than 1, that means that the actual amount of energy distributed by the heating body or bodies upstream of the intermediate temperature sensor is too high and that a correction needs to be applied to reduce the amount of energy distributed by the heating body or bodies situated downstream of this sensor. For example, if the correction factor is calculated to have a value of 1.10 that means that the amount of energy distributed by the first heating is 10% too high and that a 10% reduction in the amount of energy needs to be applied to the second heating body or bodies in order to obtain an outlet temperature that is as close as possible to the desired temperature.

Figure 3:
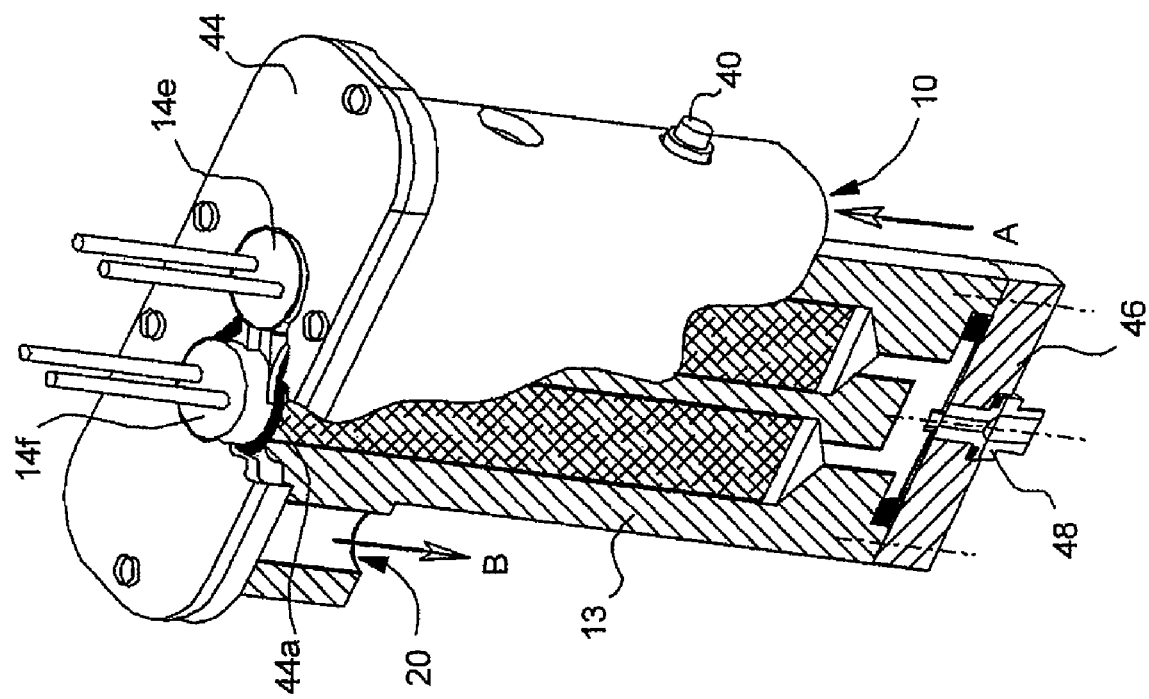
FIG. 3 is a perspective view of a device for heating a liquid according to a second embodiment of the invention.
Figure 4:
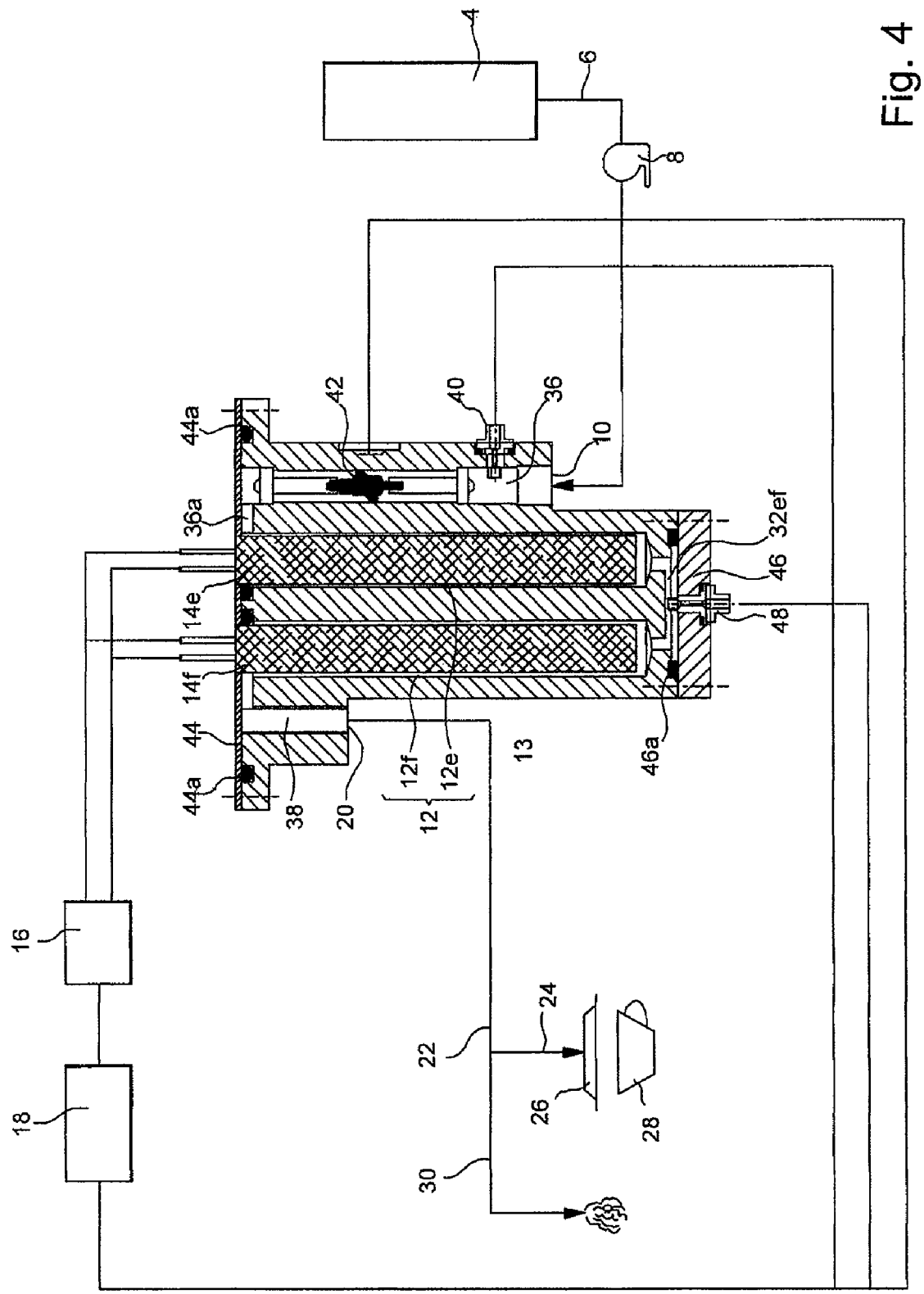
FIG. 4 is a schematic view of a coffee machine comprising the heating device of FIG. 3, the heating device being depicted in section.

FIGS. 3 and 4 depict a device for heating a liquid according to a second embodiment of the invention in which elements identical to those described in conjunction with FIGS. 1 and 2 are denoted by the same numerical references.

This heating device differs from the one described previously only in that the duct 12 provided in the body 13 and through which the liquid that is to be heated flows comprises just two duct portions 12e and 12f connected by a connecting conduit 32ef with which the intermediate temperature sensor 48 is associated and in that the heating bodies 14e and 14f associated with the duct portions 12e and 12f respectively each comprise two resistive elements, each of these being connected to the control means 18 via the switching means 16.

As in the first embodiment, the electrical resistive elements of the heating bodies 14e and 14f each produce a nominal power lower than the mains flicker theoretical power, typically less than 450 W at 230 V and the control means 18 are arranged to switch these resistive elements from the "in circuit" status to the "out of circuit" status and vice versa intermittently, typically at a frequency of the order of every 10 ms. Heating bodies of this type are, for example, heating cartridges of the "high charge" or "high density" type, that is to say ones producing a significant amount of power per unit heating area.

Figure 5:
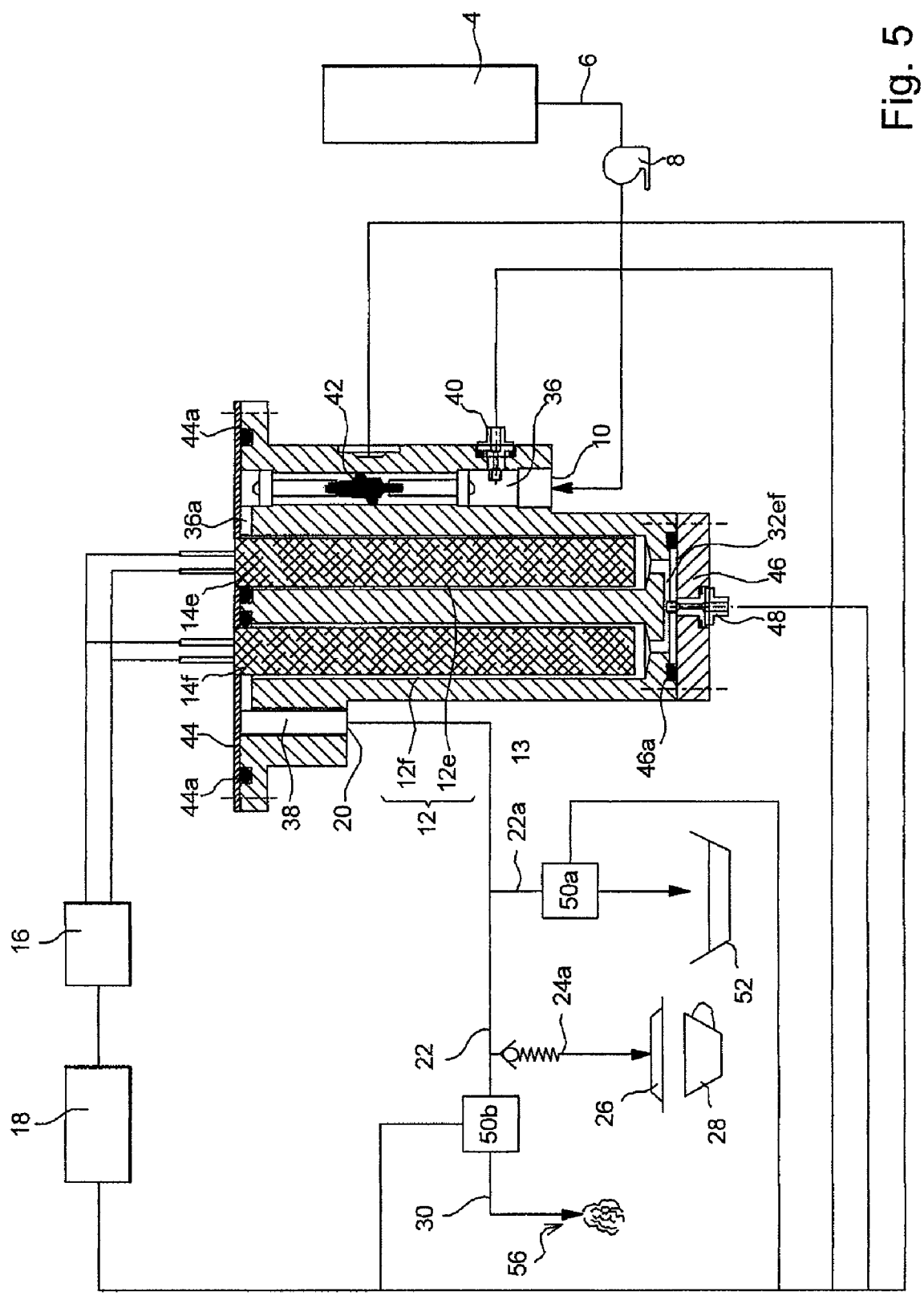
FIG. 5 is a view similar to FIG. 4, illustrating another aspect of the invention.

FIG. 5 schematically depicts a coffee machine incorporating another aspect of the invention. In this figure, elements identical to those described in conjunction with FIG. 4 are denoted by the same numerical references.

This coffee machine differs from the one described previously only in that it comprises a device allowing a "first" liquid or a "first" steam to be delivered at the appropriate temperature. To do that, the device comprises a first main duct 22 connected to the extraction device 26. A backpressure valve 24a of the duct 24 is positioned at the inlet to the device 26. A first electrically operated valve 50a is connected to a conduit portion 22a leading to a drainage tank 52. A second electrically operated valve known as the "steam" valve 50b is connected to the conduit 30 located between the first user device and the second user device formed, in this example, by a steam ejection nozzle 56. The electrically operated valves 50a, 50b are operated by the control means 18. The latter are designed to operate the electrically operated valves 50a, 50b respectively in such a way as to direct the fluid emanating from the fluid outlet 20 either towards one of the two user devices or towards the drainage tank 52 according to whether the temperature measured by the sensor 48 has or has not reached the reference temperature for the user device concerned. Note that the drainage tank may be replaced by a recirculation loop returning to the inlet 10 of the heating device. However, recirculation complicates the device because it may require an additional pump. In addition, the reference temperature is obtained after just a few seconds and the amount of water rejected is therefore generally small.

The device works as follows:

In the case of a beverage to be extracted by the extraction device 26, the "steam" electrically operated valve 50b remains closed. The water pump 8 supplies the heating device which operates according to the principle already described. The water temperature is continuously monitored by the temperature sensor 48. As long as this temperature is below a predetermined reference temperature the controller 18 keeps the "bypass" electrically operated valve 50a open so that the water leaving the heating device is not used for extraction but is drained into the drainage tank or recirculated. Once the reference temperature has been reached, the controller commands the closure of the valve 50a. The fluid can then flow until it forces the backpressure valve to open and feeds the device 26.

When the steam command is activated, such as for preparing frothy milk, the temperature rise principle is similar. At the start of heating, the valve 50b remains closed and the valve 50a is opened to drain or recirculate the fluid (generally water). Once the steam production reference temperature has been reached, the valve 50a is closed by the controller and the valve 50b is opened. As the steam pressure is too low to open the backpressure valve 24, the steam is supplied directly to the outlet 56. It should be noted that an outlet temperature sensor near the outlet 20 of the device may be used for monitoring the temperature rather than an intermediate temperature sensor.

It goes without saying that the present invention is not restricted to the embodiments which have just been described and that various simple modifications and variations may be imagined by the person skilled in the art without departing from the scope of the invention as defined by the attached claims. By way of example, the intermediate sensor 48 positioned between the chamber 12b and 12c in FIGS. 1 and 2 could just as easily be positioned between the chamber 12c and 12d, the idea being for the intermediate temperature sensor to be positioned downstream of a chamber comprising a heating body and communicating with the liquid inlet and upstream of a chamber comprising a heating body and communicating with the liquid outlet.

The invention claimed is:
1. Device for heating a fluid for preparing hot beverages, comprising a body comprising a duct for circulating a fluid, the duct having a fluid inlet and a fluid outlet and being associated with at least one electrical heating body, a supply of power to which is controlled by a switch connected to a control; the duct comprising at least first and second duct portions joined together by a third duct portion forming a connecting conduit; the first and second duct portions each being associated with at least one heating body; the connecting conduit being associated with an intermediate temperature sensor connected to the control; the intermediate temperature sensor measuring a temperature of the fluid flowing through the conduit; a flow meter measuring the amount of fluid passing through the duct and the control and switch controlling the heating body of the second duct portion according to an amount of energy that needs to be supplied in the second duct portion in order to bring the fluid that is to be heated from an intermediate temperature measured by the intermediate temperature sensor up to a reference temperature at an outlet of the device; the amount of energy being calculated by the control as a function of the amount of fluid measured by the flow meter, of the intermediate temperature measured and of the reference temperature at the outlet of the device, and the amount of energy being distributed to the heating body of the second duct portion by the control and switch at determined time intervals.

2. Device for heating a fluid according to claim 1, wherein the determined time intervals are equal to or less than 500 milliseconds.

3. Device for heating a fluid according to claim 1, wherein the heating body is immersed in the fluid that is to be heated.

4. Device according to claim 1, comprising a fluid inlet temperature sensor in direct contact with a fluid at an inlet of the device and a flow meter located upstream of the inlet of a first chamber.

5. Device according to claim 4, comprising a regulator to calculate a power correction factor to be assigned to the heating body of the second duct portion as a function of the measured inlet and intermediate temperatures.

6. Device according to claim 1, wherein each heating body comprises at least one resistive element, each resistive element of each heating body being independently switchable.

7. Device according to claim 6, comprising two heating bodies and each comprises two resistive elements, each resistive element being arranged to be switched independently of one another by the switch.

8. Device according to claim 6, comprising four heating bodies, each being housed in a separate duct portion and each comprising a resistive element, each resistive element being arranged to be switched independently by the switch.

9. Device according to claim 6, wherein each resistive element produces a nominal power lower than a mains flicker theoretical power value and in that the resistive elements are switched into an on/off position by the switch in a manner offset from one another so as to avoid power differences, in absolute terms, that exceed the nominal power of each of the resistive elements.

10. Device according to claim 6, wherein each resistive element produces a nominal electrical power of less than 450W.

11. Device for heating a fluid according to claim 1, wherein the duct portions associated respectively with at least one heating body each form a chamber joined together by a connecting conduit which has a cross section smaller than that of the chamber.

12. Device for heating a fluid according to claim 11, wherein an exterior surface of the heating bodies and an interior wall of the chamber associated therewith has helical grooving.

13. Device according to claim 11, wherein the body comprises a block in which the chambers are formed, and the chambers are mutually parallel and open on each side of the block, and are joined together at one of their ends by a connecting conduit, the body further comprises two end plates which cover first and second ends of the chambers, respectively.

14. Device according to claim 13, wherein the first end plate which is associated with first ends of the chambers comprises the heating body and the second end plate which is associated with second end of the chambers comprises the intermediate temperature sensor.

15. Device according to claim 14, wherein the first and second end plates together with the block comprise the connecting conduit.

16. Device according to claim 14, wherein the second sensor and the flow meter are positioned in a conduit formed in the block and connect the fluid inlet to the inlet of a first chamber.

17. Device according to claim 13, wherein each heating body extends over an entire length of the chamber with which it is associated and has a shape that corresponds to a shape of the chamber.

18. Device according to claim 1, wherein the intermediate temperature sensor is located downstream of a chamber communicating with a fluid inlet and upstream of a chamber communicating with a fluid outlet.

19. Method for heating a fluid for preparing coffee or other beverages, using a heating device comprising a body having a duct for the circulation of the fluid, a first heating body and a second heating body, comprising the steps of:
measuring an amount of fluid to be heated by a flow meter,
measuring an intermediate temperature by an intermediate temperature sensor located between the first and second heating bodies,
calculating a theoretical amount of energy to be supplied by the second heating body as a function of a measured amount of fluid to be heated, a measured intermediate temperature, a reference temperature at an outlet of the device and of a heat capacity of the fluid,
applying a calculated amount of energy to a switch to the second heating body, by selective switching of the heating bodies, so as to bring the fluid up to the reference temperature at the outlet of the device, and
repeating a heating of the fluid at determined time intervals.

20. Method for heating a fluid according to claim 19, wherein the heating of the fluid is repeated at time intervals of not greater than 500 milliseconds.

21. Method according to claim 19, wherein the amount of energy is applied at or after each pulse of the flow meter.

22. Method according to claim 21, wherein the interval for calculating the amount of energy is about 30 ms.

23. Method for heating a fluid, using a heating device comprising a body having a duct for circulating the fluid, a first heating body and a second heating body comprising the steps of:
measuring a temperature of fluid at an inlet to the device by using a fluid inlet temperature sensor, using a flow meter to measure an amount of fluid to be heated, calculating a theoretical amount of energy to be supplied by a first heating body by a control as a function of a measured amount of fluid, measured temperature at the inlet to the device, an intermediate reference temperature and the heat capacity of the fluid;

measuring an intermediate temperature by using an intermediate temperature sensor placed between the first heating body and a second heating body;

calculating the theoretical amount of energy to be supplied by the second heating body as a function of the measured amount of fluid to be heated, the measured intermediate temperature, the reference temperature at the outlet of the device and the heat capacity of the fluid, applying these calculated amounts of energy by a switch respectively to the first and second heating bodies, by selectively switching the heating bodies, so as to bring the fluid up to the desired reference temperature at an outlet of the device;

at least some of the steps are repeated determined time intervals.

24. Method for heating a fluid according to claim 23, wherein the steps are repeated at time intervals of not greater than 500 milliseconds.

25. Method according to claim 23, wherein the energy is applied at or after each pulse of the flow meter.

26. Method according to claim 24, wherein the interval for calculating the amounts of energy is about 30 ms.

27. Method according to claim 24 comprising calculating a correction factor using the formula:

k =(measured intermediate temperature−measured input temperature)/(reference intermediate temperature−measured input temperature), the correction factor being used to calculate the amount of energy to be supplied by the second heating body.

28. Device for heating a fluid for preparing hot beverages, comprising a body comprising a duct for circulating a fluid, the duct having a fluid inlet and a fluid outlet connected by a conduit to a user device, the duct being associated with at least one electrical heating body the power supply of which is controlled by a switch connected to a control; at least one temperature sensor being connected to the control; the control and switch being configured to control the heating body so as to bring fluid that is to be heated from a first temperature up to a reference temperature in a region of the duct at which the sensor is installed, the device comprises at least one electrically operated valve connected to the conduit between the fluid outlet and the user device and which is controlled by the control means, and the control being arranged in such a way as to control the electrically operated valve so as to direct fluid emanating from the fluid outlet towards a drainage tank or a recirculation loop when the temperature measured by the sensor has not yet reached the reference temperature and towards the user device when the measured temperature has reached the reference temperature.

29. Device according to claim 28, wherein the user device comprises a unit for extracting a substance contained in a cartridge and/or a steam ejection nozzle.

30. Device according to claim 28, comprising means allowing a back pressure to be generated, positioned downstream of the user device.

31. Device according to claim 28, wherein the electrically operated valve is a three-way valve arranged on the conduit, the three ports being connected respectively to the fluid outlet, to the drainage tank and to the user device.

32. Device according to claim 30, wherein the electrically operated valve is a simple valve placed on a bypass branch of the conduit.

* * * * *